United States Patent [19]

Cherko

[11] Patent Number: 4,915,569
[45] Date of Patent: Apr. 10, 1990

[54] COMBINATION MACHINE TOOL APPARATUS AND PALLET CHANGING SYSTEM

[75] Inventor: Carl F. Cherko, Euclid, Ohio

[73] Assignee: Oerlikon Motch Corporation, Cleveland, Ohio

[21] Appl. No.: 198,517

[22] Filed: May 25, 1988

Related U.S. Application Data

[62] Division of Ser. No. 11,146, Feb. 5, 1987, Pat. No. 4,797,989.

[51] Int. Cl.$^4$ .............................................. B65G 67/02
[52] U.S. Cl. .................................. 414/401; 198/346.1; 198/465.1; 414/222; 414/495; 414/498; 414/589; 414/608; 414/663
[58] Field of Search ............... 414/495, 222, 401, 498, 414/589, 608, 662, 663; 90/1; 198/345, 346.1, 465.1; 269/73, 309, 310; 29/563, 568, 33 P; 187/8.59, 9 R, 94

[56] References Cited

U.S. PATENT DOCUMENTS

| | | |
|---|---|---|
| 2,349,389 | 5/1944 | Thompson .................. 187/8.59 |
| 2,381,664 | 8/1945 | Hansen ....................... 187/8.59 |
| 3,446,366 | 5/1969 | Miller ........................... 414/663 |
| 3,524,556 | 8/1970 | Miller ........................... 414/589 |
| 3,576,540 | 4/1971 | Fair .............................. 340/172.5 |
| 3,781,974 | 1/1974 | Holzl et al. ..................... 29/568 |
| 3,825,245 | 7/1974 | Osbourn et al. ............... 269/30 |
| 4,031,982 | 6/1977 | Lindfors ....................... 187/9 R X |
| 4,036,377 | 7/1977 | Weber ........................... 414/495 |
| 4,299,526 | 11/1981 | Smith ............................ 414/392 |
| 4,456,418 | 6/1984 | Harter et al. ................. 414/222 X |
| 4,566,837 | 1/1986 | Shiomi et al. ................. 414/222 |
| 4,583,631 | 4/1986 | Yonezawa et al. ........... 198/465.1 X |
| 4,587,716 | 5/1986 | Bytow .......................... 29/568 |
| 4,657,463 | 4/1987 | Pipes ............................. 414/495 |
| 4,721,429 | 1/1988 | Fujita et al. ................... 187/9 R |

FOREIGN PATENT DOCUMENTS

| | | | |
|---|---|---|---|
| 1364703 | 5/1964 | France ........................... 187/9 R |
| 194847 | 11/1982 | Japan ............................. 29/568 |
| 125852 | 8/1949 | Sweden ......................... 269/309 |
| 1180233 | 9/1985 | U.S.S.R. ........................ 198/345 |
| 1162943 | 9/1969 | United Kingdom .......... 187/94 |
| 2162450 | 2/1986 | United Kingdom .......... 414/222 |
| 8602057 | 4/1986 | World Int. Prop. O. ...... 198/345 |

Primary Examiner—David A. Bucci
Attorney, Agent, or Firm—Renner, Otto, Boisselle & Sklar

[57] ABSTRACT

Combination machine tool appartaus and pallet changing system includes a single pallet changer for changing both work pieces at a work piece machining station on the machine tool and tools at a tool storage station on the machine tool. The work piece machining station and tool storage station are offset approximately 45° from each other as measured from the rotational axis of the pallet changer, which is provided with additional retractable rotational stops for locating the pallet changer at these additional 45° indexing positions. Also, the tool storage station is located forwardly of the work piece machining station, thus allowing the pallet changer to be positioned closer to the front of the machine tool in the region of the work piece machining station without interfering with the indexing movement of the pallet changer between stations. A docking assembly used to support pallets for transfer onto and off the pallet changer includes a pair of parallel spaced-apart side wall structures having locating cones thereon for locating transport fixtures for the pallets thereon. Lift cylinders on the side wall structures lift the transport fixtures up to bring the pallets into coaxial alignment with an adjacent end of the pallet changer. A flow dividing and control circuit is used to control the flow of hydraulic fluid to the lift cylinders so that the pallets are maintained level during raising and lowering of the pallets regardless of the load distribution on the pallets. A lift table assembly including counterbalance springs to reduce the drive motor peak current draw when lifting a load is used to lift transport fixtures with pallets thereon onto and off the docking assembly.

18 Claims, 14 Drawing Sheets

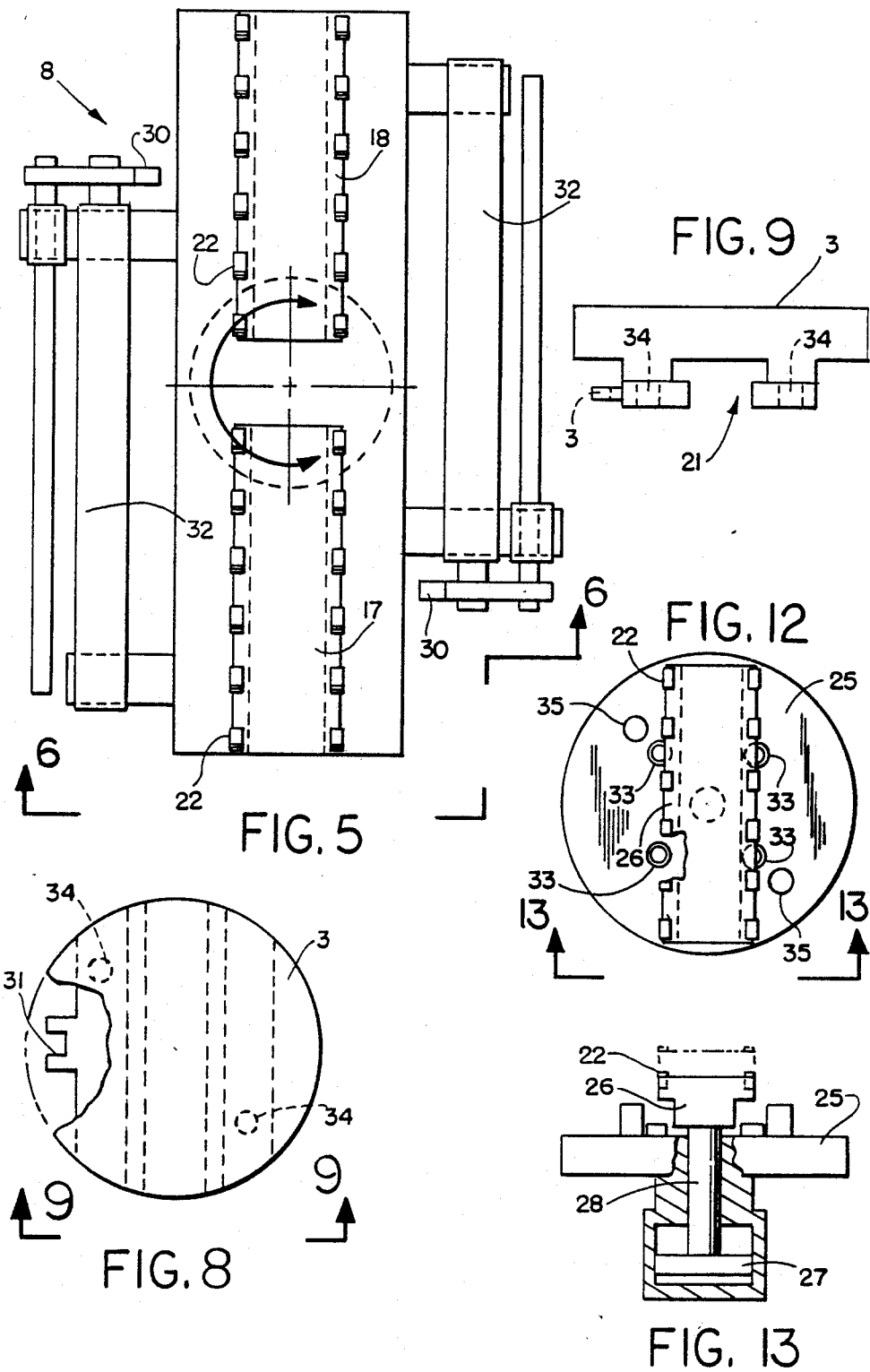

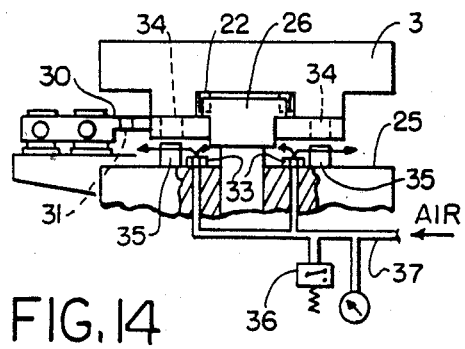
FIG. 14
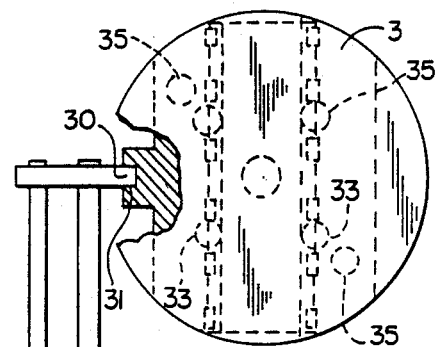
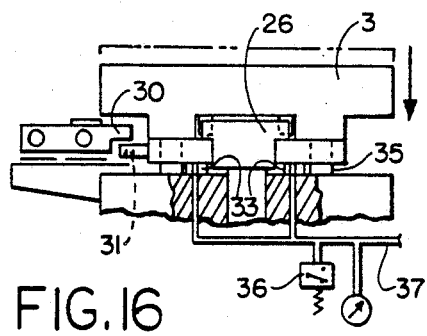
FIG. 16
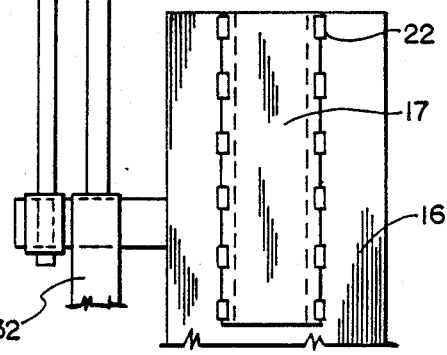
FIG. 15
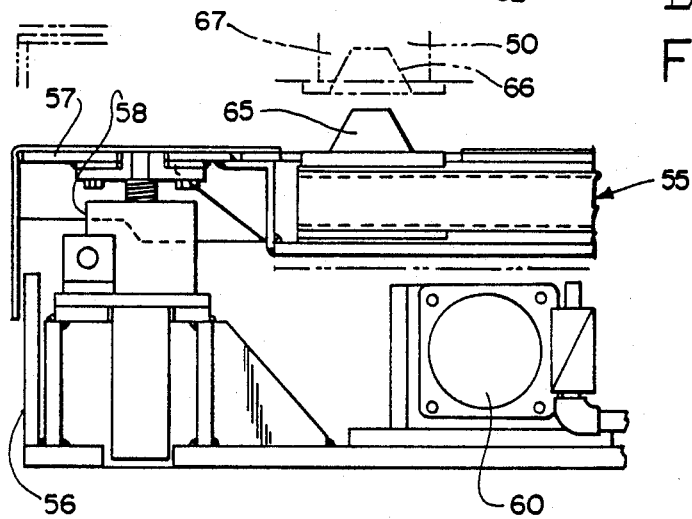
FIG. 18
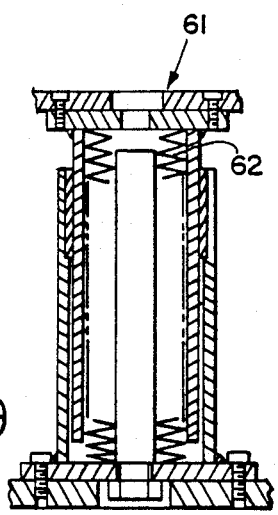
FIG. 19

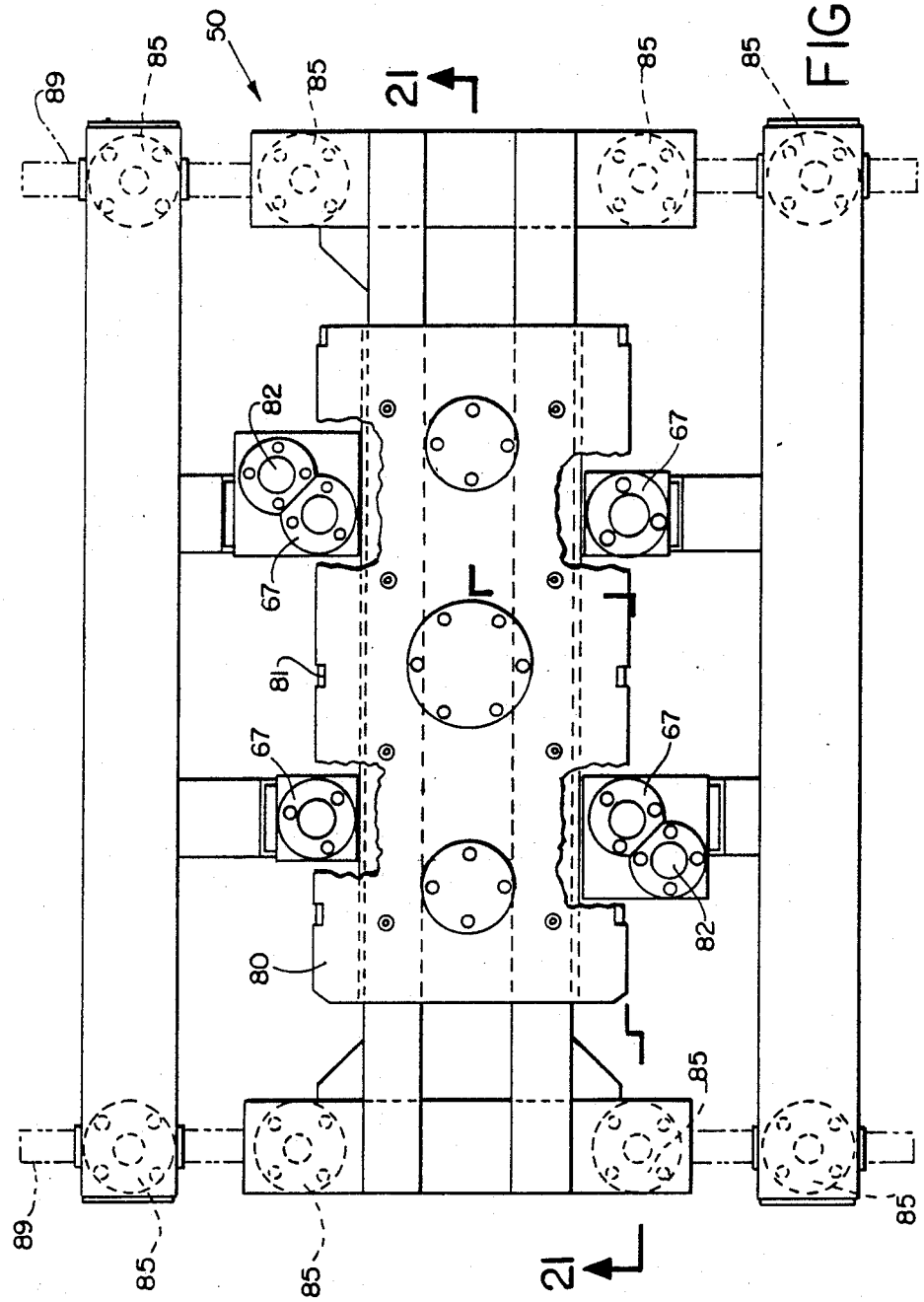

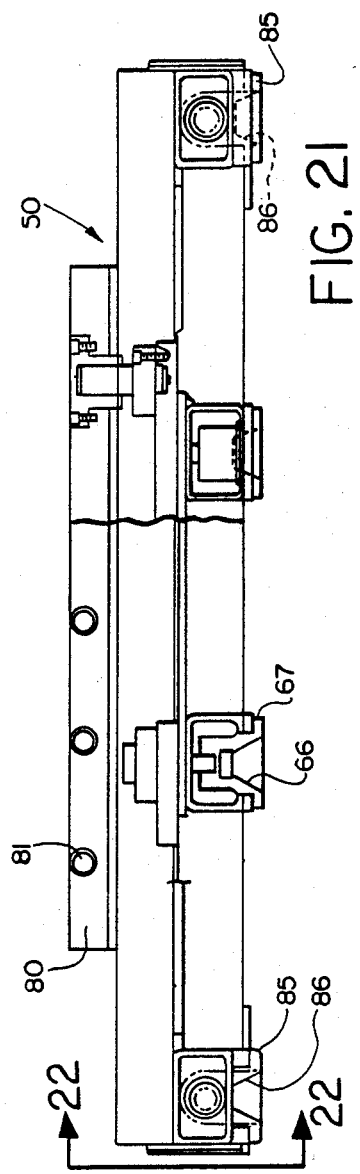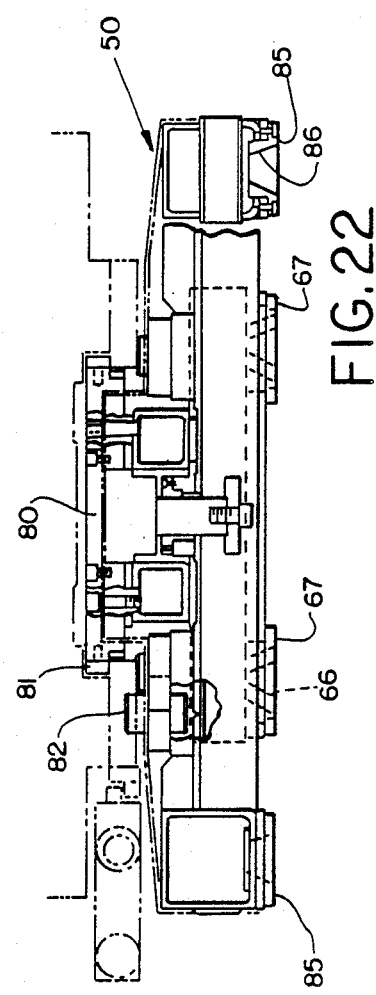

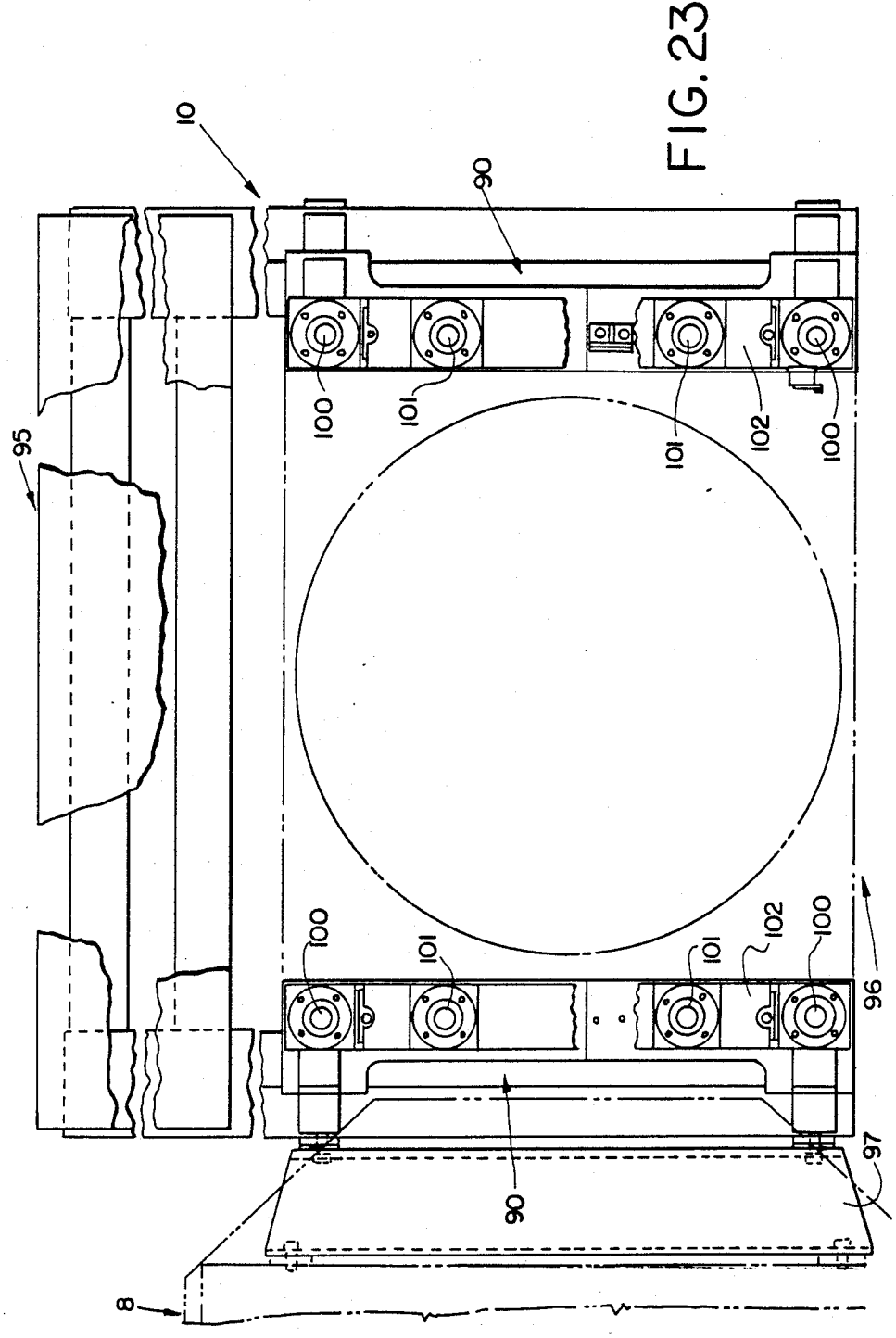

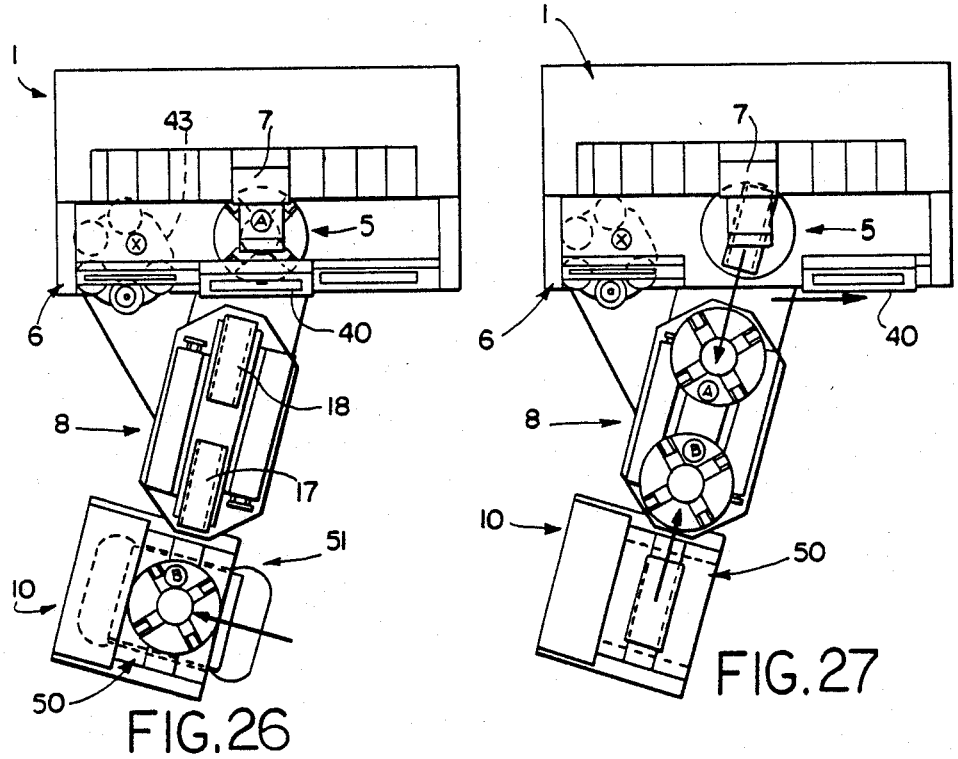
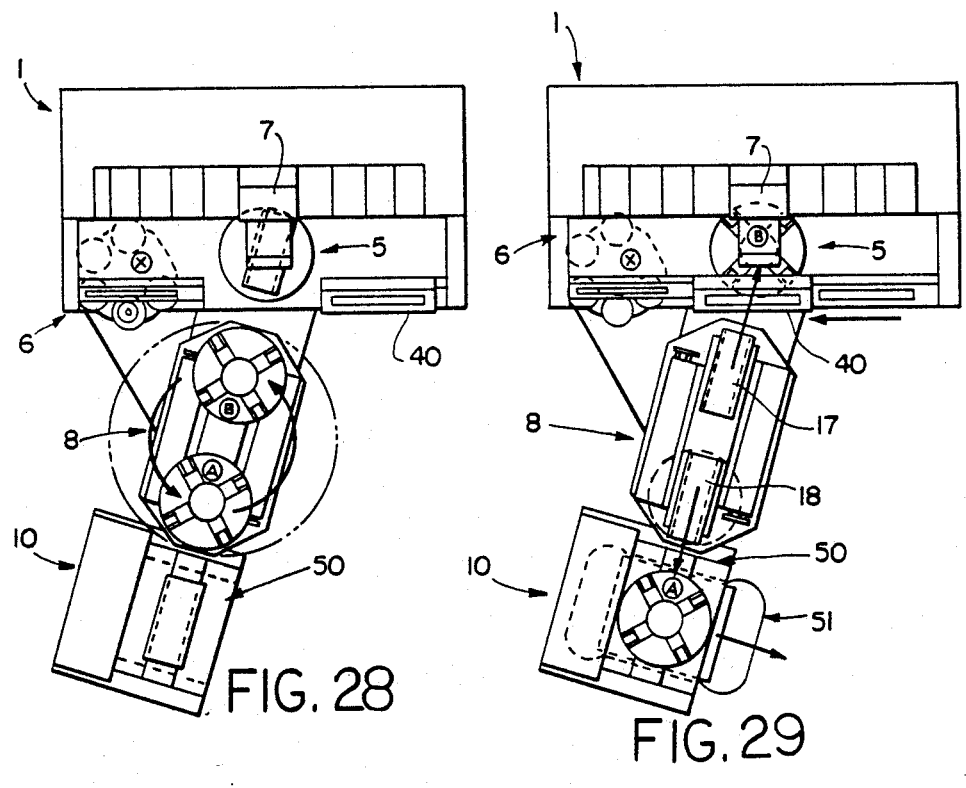

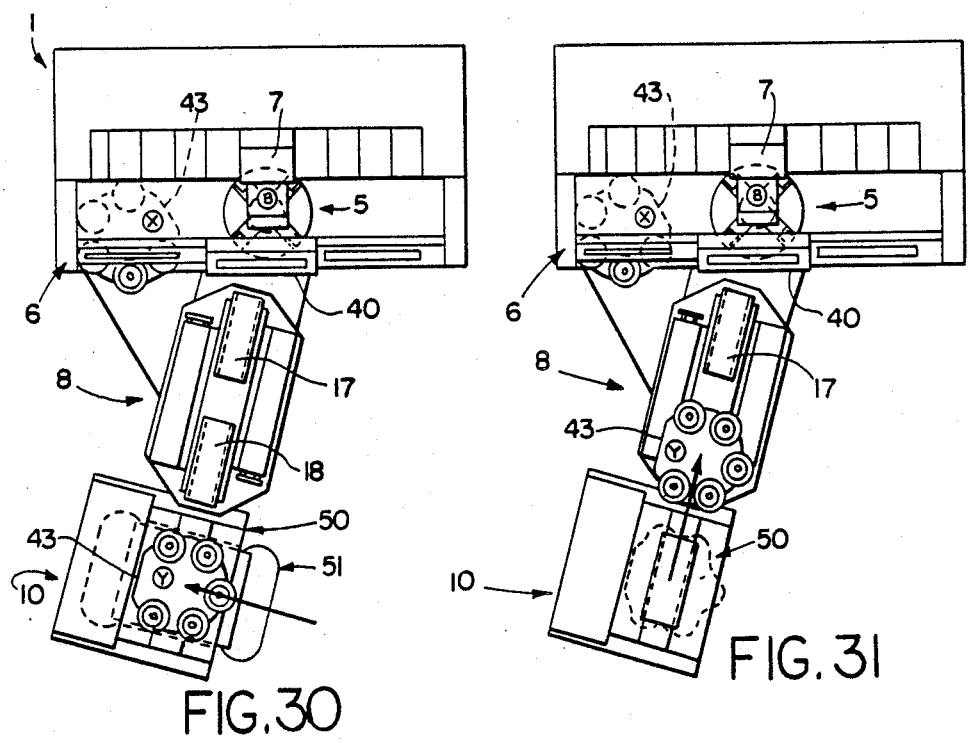
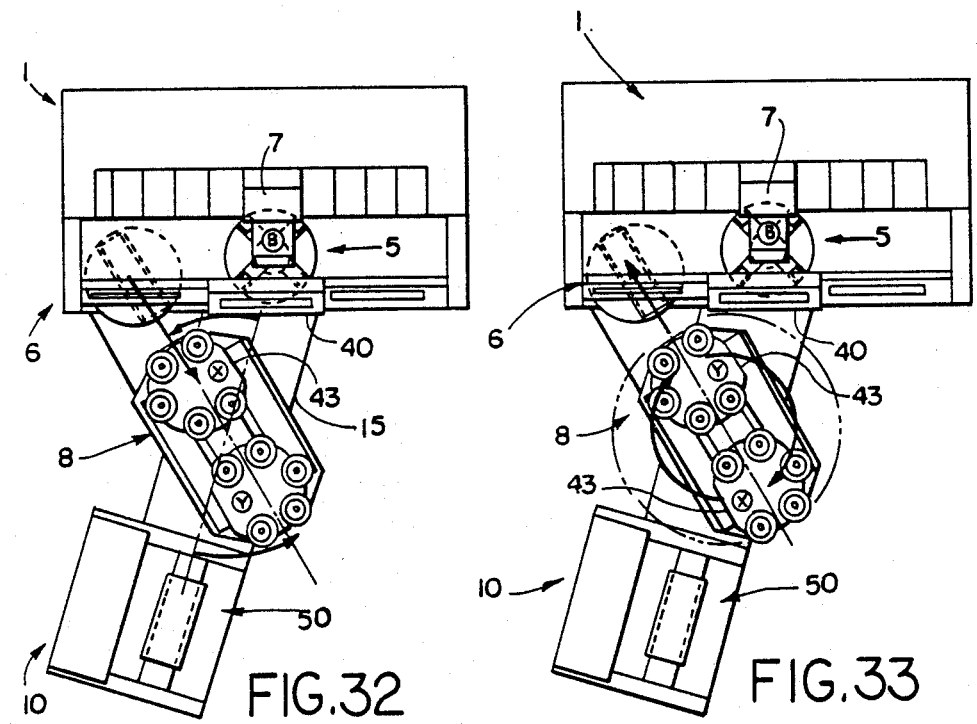

COMBINATION MACHINE TOOL APPARATUS AND PALLET CHANGING SYSTEM

This is a divisional of co-pending application Ser. No. 011,146, filed Feb. 5, 1987, now U.S. Pat. No. 4,797,989.

BACKGROUND OF THE INVENTION

This invention relates generally as indicated to a combination machine tool apparatus and pallet changing system which utilizes a single pallet changer to change both work pieces and tooling at two separate stations (locations) on a machine tool. Tha pallet changing system also desirably includes a docking assembly for receiving pallets containing either work pieces or tooling for transfer both to and from the pallet changer as well as to and from a transport vehicle having a lift table assembly for lifting the pallets onto and off the docking assembly.

The use of a single pallet changer to transfer both work piece pallets and tool pallets between a work piece machining station on a machine tool and one or more storage areas remote from the machine tool is generally known. In such a system, the tool pallet must be positioned at the work piece machining station to permit the tools to be transferred by the machine spindle from the pallet, one at a time, to a tool storage station which is also accessible to the machine spindle. This has the disadvantage that the work piece pallet must be removed from the work piece machining station before the tool pallet can be moved into position and vice versa. Accordingly, no machining operation can be performed on the work piece as long as tools are being transferred to and from the tool storage station on the machine tool.

It is also generally known to provide a common docking station for receiving both work piece pallets and tool pallets for transfer onto a pallet changer and return. It is also generally known to use a transport vehicle such as an automatic guided vehicle (AGV) to transport the pallets to the docking station for transfer onto the docking station or for picking up the pallets and returning same to one or more pallet staging (storage) areas remote from the machine tool. However, there is a need for a more effective way of raising and lowering the pallets at the docking station into and out of coaxial alignment with the pallet changer.

SUMMARY OF THE INVENTION

With the foregoing in mind, it is a principal object of this invention to provide a combination machine tool apparatus and pallet changing system which utilizes a single pallet changer for changing both work pieces at a work piece machining station on the machine tool and tools at a tool storage station on the machine tool which are readily accessible to the machine spindle. This permits the tools at the tool storage station to be changed while machining operations are being performed on a work piece at the work piece machining station.

Another object is to provide such a system in which the pallet changer is indexable to position either of its ends in alignment with the work piece machining station and tool storage station on the machine tool and a docking station spaced from the machine tool with the pallet changer positioned therebetween.

Still another object is to provide such a system in which opposite ends of the pallet changer may be positioned in alignment with one of the machine tool stations and the docking station.

Yet another object is to provide such a system in which the work piece machining station and tool storage station are offset approximately 45° from each other as measured from the rotational axis of the pallet changer.

A further object is to provide such a system in which the pallet changer is indexable 180° to bring either end into alignment with the work piece machining station, and is further indexable an additional 45° to bring either end into alignment with the tool storage station on the machine tool.

Another object is to provide such a system with additional retractable rotational stops for locating the pallet changer at the additional 45° indexing positions.

Still another object is to provide such a system in which the rotational axis of the tool storage station is located forwardly of the rotational axis of the work piece machining station on the machine tool, thus allowing the pallet changer to be positioned closer to the front of the machine in the region of the work piece machining station without interfering with the indexing movement of the pallet changer between the work piece machining station and tool storage station.

Another object is to provide such a system including a docking assembly having locating cones on the top of a pair of parallel spaced-apart side wall structures for accurately locating transport fixtures for the pallets thereon.

Still another object is to provide such a system in which the side wall structures of the docking assembly have lift cylinders mounted thereon for lifting the pallets up to bring the pallets into coaxial alignment with an adjacent end of the pallet changer.

Yet another object is to provide such a system with a plurality of locating cones mounted for vertical movement by the lift cylinders.

Another object is to provide a hydraulic flow dividing and control circuit for controlling the flow of hydraulic fluid to the lift cylinders so that the pallets are maintained level during raising and lowering of the pallets by the lift cylinders regardless of the load distribution on the pallets.

Still another object is to provide such a system with a novel lift table assembly for lifting a transport fixture with pallet thereon onto and off the docking assembly.

Yet another object is to provide such a system in which the lift table assembly is substantially counterbalanced to reduce the drive motor peak current draw while lifting a load.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 5 is an enlarged top plan view of the pallet changer of FIG. 2;

FIG. 8 is an enlarged top plan view of a work piece pallet in accordance with invention having portions broken away to show a hook engaging slot in a side portion thereof;

FIG. 9 is a side elevation view of the work piece pallet of FIG. 8 as seen from the plane of the line 9—9 thereof;

FIG. 12 is a top plan view of a typical rotatable support member located at each of the machine tool stations;

FIG. 13 is a side elevation view of the rotatable support member of FIG. 12 as seen from the plane of the line 13—13 thereof, with portions broken away to show the lift cylinder and draw bar used to raise and lower the receiver plate which constitutes part of the rotatable support member;

FIGS. 14 and 16 are schematic illustrations showing how a pallet is transferred from the pallet changer onto one of the machine tool stations and then clamped in place at such machine tool station;

FIG. 15 is a fragmentary top plan view showing how a pallet is transferred from one end of the pallet changer onto a machine tool station;

FIG. 18 is a partial side elevation view of the lift table of FIG. 17;

FIG. 19 is an enlarged longitudinal section through a counterbalance spring assembly which constitutes part of the lift table assembly of FIGS. 17 and 18;

FIG. 20 is an enlarged top plan view, with portions broken away, of a transport fixture which is used to support a pallet while being transported to and from the docking assembly;

FIG. 21 is a sectional view through the transport fixture of FIG. 20 generally taken along the plane of the line 21—21 thereof;

FIG. 22 is a fragmentary end elevation view of the transport fixture of FIG. 21 as seen from the plane of the line 22—22 thereof;

FIG. 23 is an enlarged fragmentary top plan view of the docking assembly of FIG. 2;

FIGS. 26-34 are schematic top plan views of the combination machine tool apparatus and pallet changing system similar to FIG. 1 but schematically showing how the pallet changer is used to change both work pieces and tooling on the machine tool apparatus.

DETAILED DESCRIPTION OF THE PREFERRED EMBODIMENTS

Figure 1:
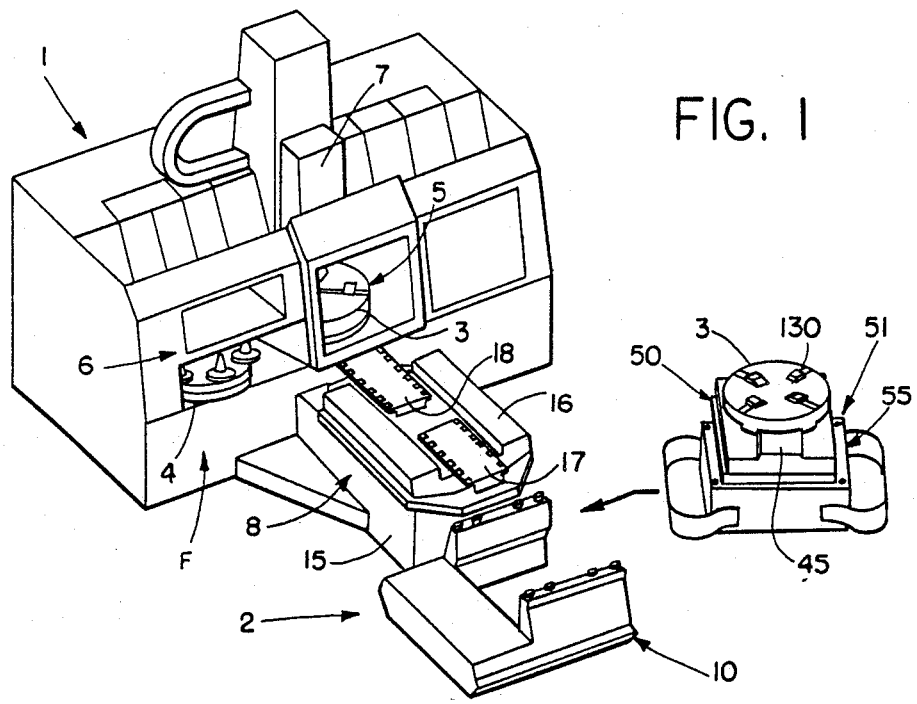
FIG. 1 is a perspective view schematically showing a preferred form of combination machine tool apparatus and pallet changing system in accordance with this invention.
Figure 2:
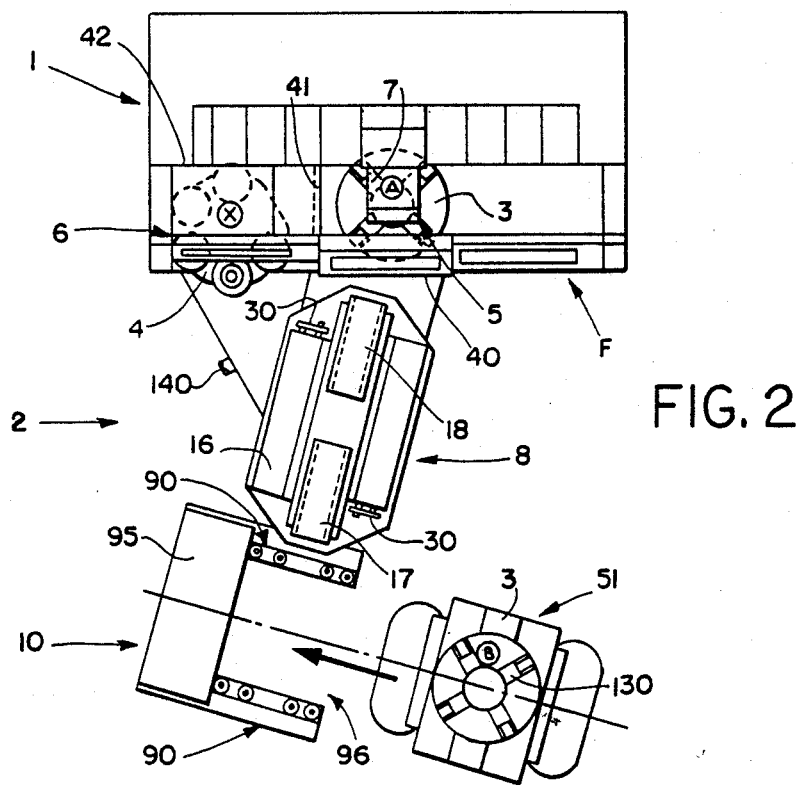
FIG. 2 is a top plan view of the machine tool apparatus and pallet changing system of FIG. 1.

Referring now in detail to the drawings, and initially to FIGS. 1 and 2, there is shown a preferred form of machine tool apparatus 1 and pallet changing system 2 in accordance with this invention for use in transferring both work piece pallets 3 and tool pallets 4 and from the machine tool apparatus as described hereafter. The machine tool 1 may be of any suitable type and includes a work piece machining station 5 and tool storage station 6 in close proximity to each other, with one or more tool spindles 7 supported for lateral (horizontal) movement between the two stations as well as vertical movement. Although the machine tool apparatus 1 depicted herein is a vertical grinding machine and the tools are grinding wheels, it is to be understood that the pallet changing system 2 of the present invention can be used to change both work pieces and different tooling on other types of machine tools as well.

The pallet changing system 2 is located adjacent the front F of the machine tool apparatus 1 and desirably includes in addition to a two-station pallet changer 8, a docking assembly 10 for supporting both work piece pallets 3 and tool pallets 4 thereon for transfer to and from the machine tool utilizing the pallet changer. The pallet changer 8 may be of conventional type, and as shown in greater detail in FIGS. 3 and 5-7, includes a base member 15 having an elongated swivel frame 16 mounted thereon for rotational movement in a horizontal plane around a vertical center axis. At each end of the swivel frame 16 is a receiver plate 17, 18 suitably shaped for sliding receipt of both work piece and tool pallets thereon.

In the embodiment desclosed herein, each receiver plate 17, 18 includes a center web 19 with a transfer flange 20 at the top which is receivable in a keyhole slot 21 in the bottom of the pallets 3, 4 (see FIGS. 9 and 11) for sliding movement of the pallets along the receiver plates. Suitable rollers 22 may be provided along the upper side edges of the receiver plates 17, 18 to aid in the transfer of the pallets onto and off the pallet changer.

Moreover, both the work piece machining station 5 and tool storage station 6 on the machine tool 1 include respective rotatable support members 25 with receiver plates 26 thereon as shown in FIGS. 12-14 and 16 for receiving the respective work piece and tool pallets from either end of the pallet changer 8 when moved into alignment therewith as described hereafter. Each of these receiver plates 26 is desirably connected to a lift cylinder 27 by means of a draw bar 28 (see FIG. 13) to permit limited raising and lowering of the receiver plates into and out of the plane of the receiver plates 17, 18 on the pallet changer. When the receiver plates 26 at the respective machine tool stations 5, 6 are in the raised position and one of the pallet changer receiver plates 17, 18 is in alignment therewith, the receiver plates 26 and 17 or 18 will be in coaxial alignment with each other, with a gap therebetween preferably no greater than one-half the diameter of the pallets. Accordingly, a simple pushing or pulling force applied to the pallets will cause the pallets to slide from one receiver to the other.

One way to effect such transfer of the pallets between the respective receivers on the pallet changer and machine tool stations is to provide a hook 30 on each side of the pallet changer 8, one for engagement in a side facing slot 31 in each pallet when supported on the respective pallet changer receiver plates 17, 18. The hooks 30 may be connected to opposite sides of the pallet changer swivel frame 16 by means of hydraulic cylinders 32 which when extended or retracted either push a pallet off the pallet changer and onto one or the other of the machine tool stations 5, 6 or pull the pallet from one or the other of the machine tool stations back onto the pallet changer.

Engagement of the hooks 30 in the slots 31 in the pallets occurs during raising of the machine tool station receivers into coaxial alignment with the pallet changer receivers after the hooks have been extended into vertical alignment therewith. Conversely, lowering of the machine tool station receivers causes the pallets to become disengaged from the hooks. During lowering of the machine tool station receivers, the pallets supported thereby may be clamped against locating pads 33 on the respective rotatable supports 25 at each of the machine tool stations 5, 6 (see FIGS. 14 and 16). Locating holes 34 may also be provided in the bottom of the pallets for engagement by locating pins 35 on the rotatable supports accurately to locate the pallets at the respective machine tool stations. To detect whether the pallets are properly clamped against the locating pads 33, a suitable air flow may be provided through the locating pads, with a pressure switch 36 in the air flow lines 37 to sense a change of pressure in the air flow lines as schematically shown in FIGS. 14 and 16. When the pallets are properly seated and clamped in place against the locating pads, the pallets will block the flow through the air flow lines 37, which will be detected by the pressure switch 36.

In order to be able to use the same pallet changer 8 to service both the work piece station 5 and tool storage station 6 on the machine tool 1, such stations must be sufficiently close together to be readily accessible by the pallet changer without interfering with the operation of either the machine tool or pallet changer. Also, the location of the machine tool stations both relative to each other and relative to the pallet changer must be such that the pallet changer is free to be indexed from one station to the other and still provide a maximum gap of no more than one-half the length of a pallet when in position at either station so that the pallet does not become unstable during transfer between the pallet changer and the respective stations.

Figure 4:
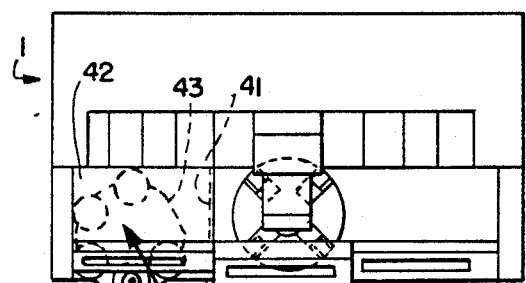
FIG. 4 is a schematic top plan view similar to FIG. 3 except that a transport fixture has been transferred from the automatic guided vehicle onto the docking assembly, a tool pallet has been placed on the pallet changer, and the pallet changer has been indexed 45° from the FIG. 2 position in which one end is in alignment with a work piece machining station to the FIG. 4 position in alignment with a tool storage station on the machine tool.
Figure 6:
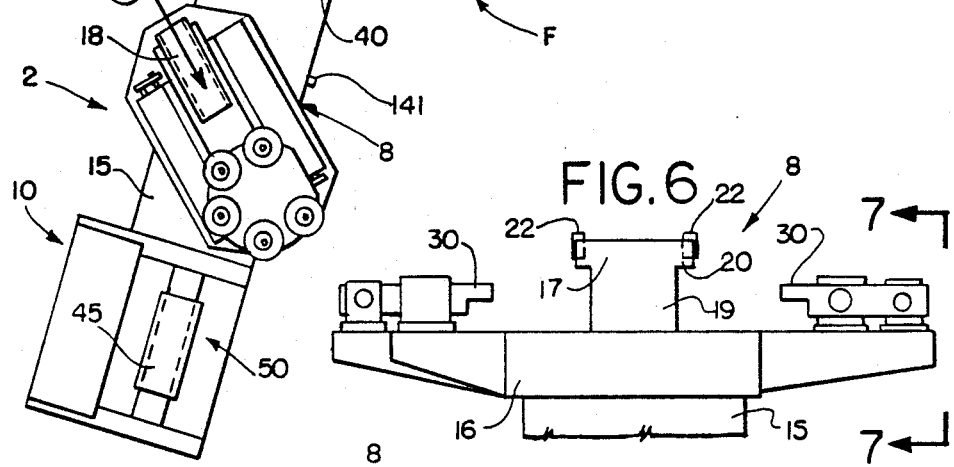
FIG. 6 is a fragmentary end elevation view of the pallet changer of FIG. 5 as seen from the plane of the line 6—6 thereof.
Figure 7:
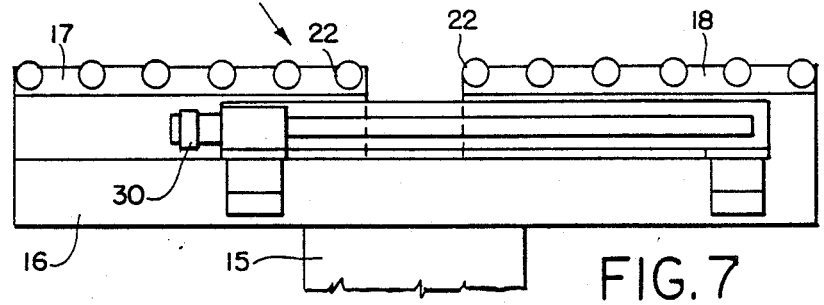
FIG. 7 is a fragmentary side elevation view of the pallet changer of FIG. 6 as seen from the plane of the line 7—7 thereof.

To that end, the two machine tool stations 5, 6 are desirably offset approximately 45° from each other as viewed from the rotational axis of the pallet changer 8. Also, the rotational axis of the tool storage station 6 is desirably located forwardly of the rotational axis of the work piece machining station 5 as shown in FIGS. 2 and 4 so that the pallet changer can be positioned closer to the front of the machine tool in the region of the work piece machining station 5 than would otherwise be possible without interfering with the indexing movement of the pallet changer between the two stations 5, 6. Locating the pallet changer closer to the work piece machining station has the advantage of being able to set the work piece machining station back further relative to the front of the machine tool so that there is sufficient room for a sliding door 40 in front of the work piece machining station for use in closing off all access thereto during the machining operation for safety reasons.

A partition 41 is provided between the work piece machining station 5 and tool storage station 6 to prevent work piece chips and the like from contaminating the tool couplings at the tool storage station during the machining operations. Preferably, the partition 41 extends upwardly between the two stations and over the top of the tool storage station, with an access door 42 being provided in the top portion of the partition as schematically shown in FIGS. 2 and 4 to allow for accessing the tools by the machine spindles 7 when moved into vertical alignment therewith.

To prevent the access door 40 to the work piece machining station 5 from interfering with the removal and replacement of the tool pallets 4 at the tool storage station 6 while the access door is in the closed position shown in FIGS. 2 and 4, the tool pallets 4 are desirably provided with a chordal face 43 along one side to reduce the width of the tool pallets on the side facing the access door so that the pallets will clear the access door during movement therepast by the pallet changer as schematically illustrated in FIG. 4.

Figure 3:
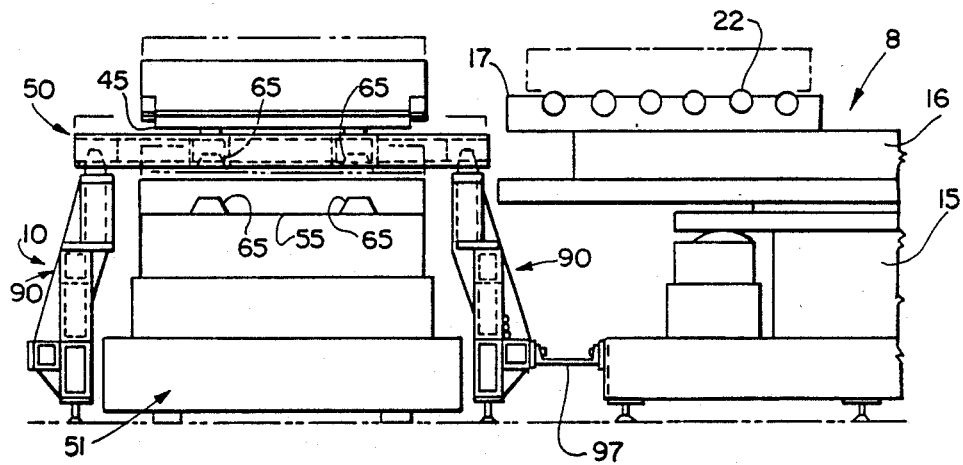
FIG. 3 is a fragmentary side elevation view of the pallet changing system of FIG. 2.

A suitable receiver plate 45, schematically shown in FIGS. 3 and 4, is also desirably provided at the docking assembly 10 for ease of transfer of a pallet from the docking assembly to either end of the pallet changer 8 and return. The spacing between the receiver plate 45 at the docking assembly 10 and receiver plates 17, 18 on either end of the pallet changer when brought into alignment therewith is also desirably no greater than one-half the length of the pallet to maintain stability of the pallet during transfer from one receiver to the other.

Figure 17:
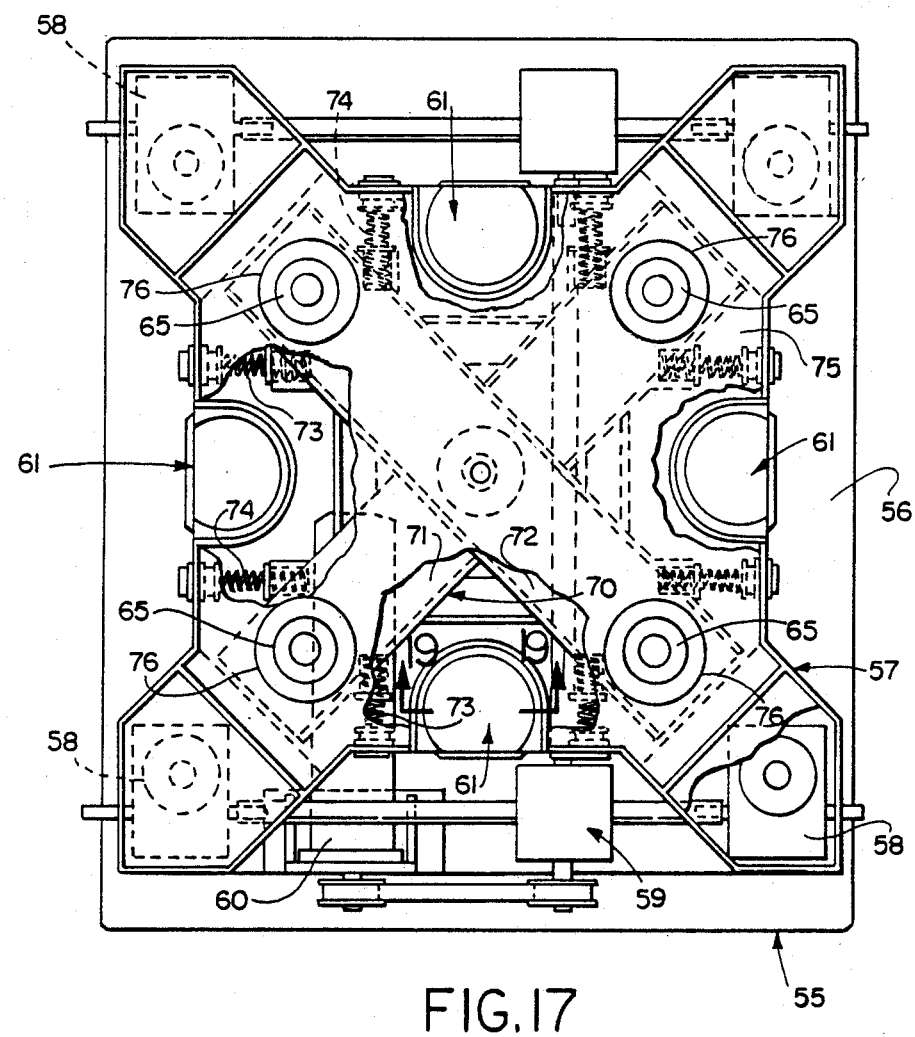
FIG. 17 is top plan view, with portions broken away, of a lift table assembly for use in lifting a transport fixture and associated pallet onto and off the docking assembly.

However, the receiver plate 45 for the docking assembly 10, rather than being an integral part thereof, is desirably part of a movable transport fixture 50 which may be used to support a pallet while being transferred to and from the docking assembly using a transport vehicle 51 of suitable type. The transport vehicle 51 illustrated herein is a battery-powered automatic guided vehicle (AGV), and is used to transport either work piece or tool pallets, one at a time, between the docking assembly and one or more staging (storage) areas remote from the machine tool apparatus. The vehicle itself may be of conventional type but is desirably fitted with a special lift table assembly 55, schematically shown in FIGS. 17 and 18, for lifting the transport fixture 50 and associated pallet onto and off the docking assembly as described hereafter.

Lift table assembly 55 includes a base plate 56 which may be suitably secured to the top portion of the transport vehicle 51 for movement therewith. Mounted for limited vertical movement relative to the base plate 56 is a main frame 57 which may be supported at its four corners by four screw type jackets 58. A suitable screw drive mechanism 59 may be provided for driving all four jacks off a single motor 60 thus to ensure uniform raising and lowering of the main frame without tilting the pallet supported thereby.

Preferably, the motor 60 is a DC servomotor powered by the vehicle battery. To reduce the peak current draw from the vehicle battery while lifting a load, a counterbalance force is desirably applied to the main frame 57. In the preferred embodiment disclosed herein, a plurality of uniformly spaced counterbalance spring assemblies 61, each containing a stack of Belleville springs 62 (see FIG. 19) which have a substantially constant spring rate over their compressed length to produce a near constant counterbalance force acting on the main frame to reduce the drive motor peak requirement, for example, to approximately one-half that needed without the counterbalance springs. As an example, if a 3,000 lb. force is provided by the counterbalance springs 61, it will only require 3,000 lb of force to raise a 6,000 lb. load. Likewise, if there is no load acting on the main frame (as when the transport fixture and pallet supported thereby have been transferred onto the docking assembly) a 3,000 lb. force will be required to lower the main frame. Reducing the drive motor peak requirement has the benefit of permitting use of a smaller, lighter, less costly motor 60 and a less costly, lower current drive capacity battery than would otherwise be required to lift the same load.

While the lift table assembly 55 is shown mounted on the AGV, such lift table assembly is a self-contained unit and may be used in other applications as well. For example, the lift table assembly may be mounted at a stationary location and used to lift transport fixtures off a moving conveyor or the like.

To accurately locate the transport fixture 50 on the lift table assembly 55, a plurality of locating cones 65 may be provided on the main frame 57 for receipt in correspondingly tapered sockets 66 in locating pads 67 on the underneath side of the transport fixture 50 (see FIGS. 18 and 20-22). In the preferred embodiment disclosed herein, four such locating cones 65 are provided on the main frame 57 for receipt in four correspondingly tapered sockets 66 on the transport fixture. The locating cones 65 are desirably attached to a floating sub-frame 70 mounted for limited lateral (horizontal) movement in any direction with respect to the main frame as described hereafter.

Sub-frame 70 may be formed as by providing a pair of cross beams 71, 72 extending at right angles to each other and connected together intermediate their ends. At the ends of each cross beam 71, 72 are the locating cones 65. Centering springs 73, 74 act on opposite sides of each end of the cross beams normally to maintain the floating sub-frame 70 in a centered position with respect to the main frame. However, the springs 73, 74 allow the sub-frame 70 to float horizontally relative to the main frame 57 to facilitate proper engagement of the locating cones 65 on the lift table assembly 55 with the tapered sockets 66 on the transport fixture 50 when the transport fixture is supported by the docking assembly 10 even though there may be some misalignment therebetween when the transport vehicle 51 is moved under the transport fixture at the docking station because of the inability to accurately position the vehicle at the docking station. A suitable cover plate 74 (see FIG. 17) may be placed over the sub-frame 70, with holes 76 therein for the locating cones 65 which are sufficiently large so as not to interfere with the desired floating movement of the sub-frame therebeneath.

The transport fixture 50, like the pallet changer 2 and machine tool stations 3, 4, includes a receiver plate 80 with rollers 81 for supporting a pallet thereon (See FIGS. 20-22). Also, a pair of locating pins 82 may be provided on the transport fixture for locating a pallet thereon.

In addition to the four locating pads 67 on the transport fixture 50 which are engaged by the locating cones 65 on the lift table assembly 55, additional locating pads 85 are provided at both ends of the transport fixture 50 each containing tapered sockets 86 for engagement by locating cones on the docking assembly 10 as described hereafter. Also, locating bars 89, shown in phantom lines in FIG. 20, may be provided at each end of the transport fixture to facilitate lifting of the transport fixture onto and off the vehicle lift table assembly 55.

Figure 24:
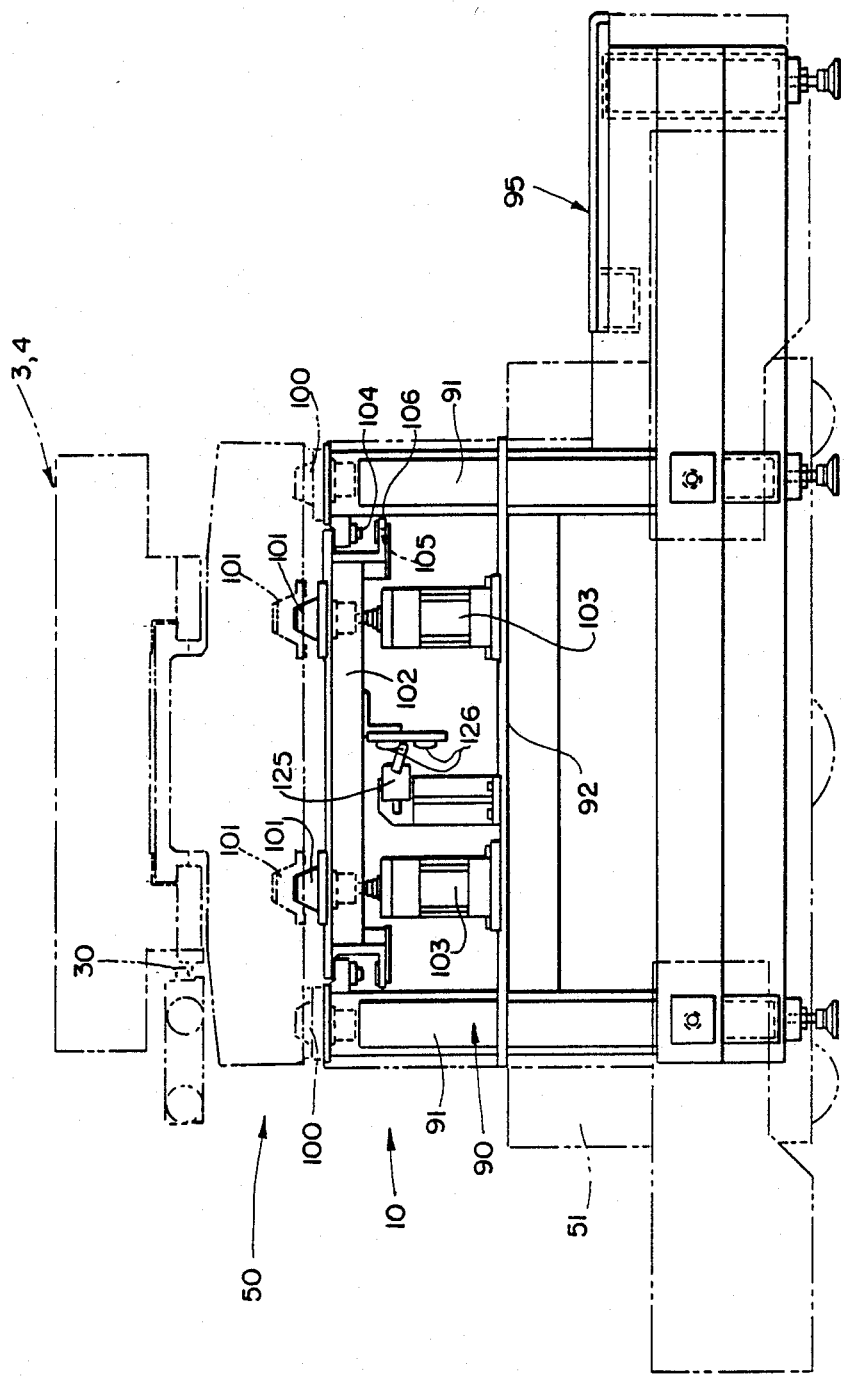
FIG. 24 is a side elevation view of the docking assembly of FIG. 23 as seen from the right side thereof.

The docking assembly 10 is generally U-shaped, and as shown in greater detail in FIGS. 23 and 24, includes a pair of laterally spaced side wall members 90 each consisting of a pair of support columns 91 at each end connected together as by a cross beam 92. The side wall members 90 are in turn connected together at one end only by a frame member 95, thus providing an opening 96 between the column structures at the other end to permit the transport vehicle 51 to be driven in between the side wall members from the open end thereof. A setting beam 97 (shown in FIGS. 3 and 23) may be used to attach the docking assembly 10 to the pallet changer 8 for maintaining the desired alignment therebetween.

At the top of each support column 91 at opposite ends of each side wall member 90 is a fixed locating cone 100 adapted to engage the tapered sockets 86 of the locating pads 85 at each end of the transport fixture 50. Intermediate the fixed locating cones 100 are two additional locating cones 101 that are supported by beams 102 adjacent the top of each side wall member 90. Each beam 102 may be raised and lowered by a pair of fluid cylinders 103 for moving the additional locating cones 101 from a height corresponding to that of the fixed locating cones 100 to a height above the fixed locating cones for a purpose to be subsequently described.

The cylinders 103 are mounted on the cross beam 92 directly beneath the movable beams 102. Also, suitable guides may be provided on the support columns 91 and movable beams 102 for guiding the movable beams during vertical movement thereof, including, for example, locating pins 104 on the support columns engageable by pilot holes 105 in bushings 106 on the movable beams.

The purpose of the vertically movable locating cones 101 on the docking assembly 10 is to provide for the lifting of the receiver plate 80 and associated pallet 3 or 4 off the transport fixture 50 and to move the pallet into coaxial alignment with the pallet changer 8 when it is desired to transfer the pallet from the docking assembly to the pallet changer or return. Of course, in order to engage the pallet changer hook 30 in a pallet slot 31, the hook must be extended to bring the hook into vertical alignment with the slot before the pallet is raised to engage the hook in the slot. With the hook engaged in the slot, the pallet will be pulled off the receiver plate at the docking station and onto the associated receiver plate on the pallet changer during retraction of the hook. Conversely, in order to transfer a pallet from the pallet changer onto the docking assembly, first the hook must be extended to push the pallet off the pallet changer and onto the transport fixture at the docking assembly, and then the pallet must be lowered to disengage the pallet from the hook.

Figure 25:
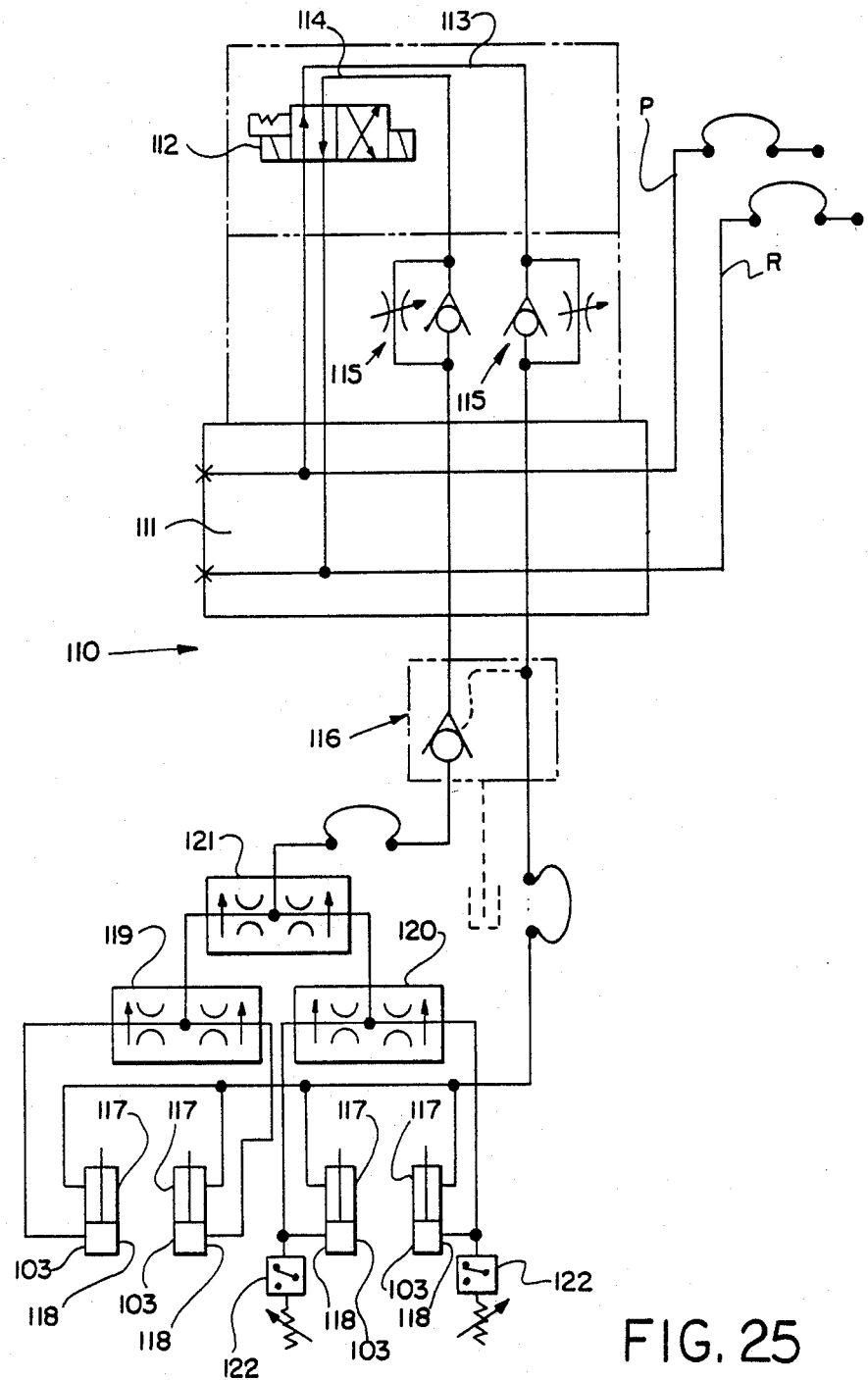
FIG. 25 is a schematic illustration of a hydraulic flow dividing and control circuit for controlling the flow of hydraulic fluid to the lift cylinders of the docking assembly.
Figure 34:
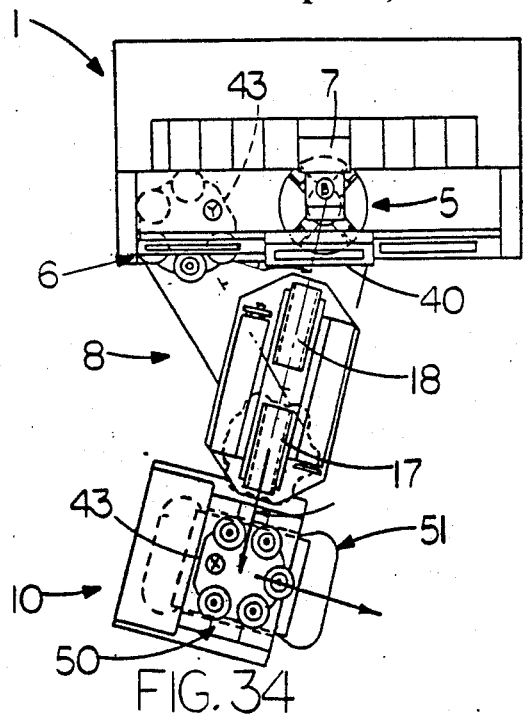

A hydraulic flow dividing and control circuit 110, schematically shown in FIG. 25, may be provided for controlling the flow of hydraulic fluid to the lift cylinders 103 to ensure that the lift cylinders are raised and lowered at the same rate regardless of the distribution of the load supported thereby. Circuit 110 may include a station subplate 111 to facilitate coupling of the fluid pressure and return lines P and R to a solenoid valve 112 which is used to control the flow of fluid to and from opposite ends of the lift cylinders 103 through additional fluid lines 113 and 114 connected thereto.

Fluid flow through the fluid lines 113, 114 passes through fluid control valves 115 and a pilot check valve 116 interposed between the solenoid valve 112 and lift cylinders 103. The rod ends 117 of all four lift cylinders 103 are connected in parallel to the pilot check valve 116, whereas the head (load) ends 118 of each pair of lift cylinders 103 are connected to opposite ends of a pair of flow control valves 119, 120 for providing the same amount of flow to the lift cylinders of each pair. Likewise, the flow control valves 119, 120 are connected at their center points to the opposite ends of a third flow control valve 121 which in turn is connected at its cener point to the pilot check valve 116 for making certain that the same amount of fluid flows to both flow control valves 119, 120. Suitable pressure switches 122 may also be connected to the head (load) ends 118 of one pair of lift cylinders 103.

One or more limit switches 125 (see FIG. 24) may be positioned on the movable beam 102 to provide positive feedback to the machine control to confirm that the lift cylinders 103 and thus the pallet supported thereby has raised or lowered. Suitable cams 126 may be provided on one of the movable support beams 102 to control the operation of the limit switch 125. The lift cylinders 103 remain constantly pressurized at the ends of their strokes positively to hold the pallet in its desired raised or lowered position.

From the foregoing, it will now be apparent that the hydraulic flow dividing and control circuit 110 prevents cocking or tilting of the pallets during raising and lowering by the docking assembly, thus ensuring that the pallets will always remain level during such movement.

The pallets 3, 4 for both work pieces and tools may be similarly constructed, each including a keyhole slot 21 on the bottom side for sliding engagement along the receiver plates on the pallet changer, machine tool station and transport fixture, a side facing slot 31 for engagement by the pallet changer hooks 30, and a pair of locating holes 34 for engagement by the locating pins 35 at the respective machine tool stations. In addition, however, suitable fixtures 130, schematically shown in FIGS. 1 and 2, may be provided on the upper face of the work piece pallets 3 to clamp work pieces in place on the pallets. Also, the work piece pallets 3 are desirably circular in shape to facilitate rotation about a center axis when mounted at the work piece machining station 5.

Figure 10:
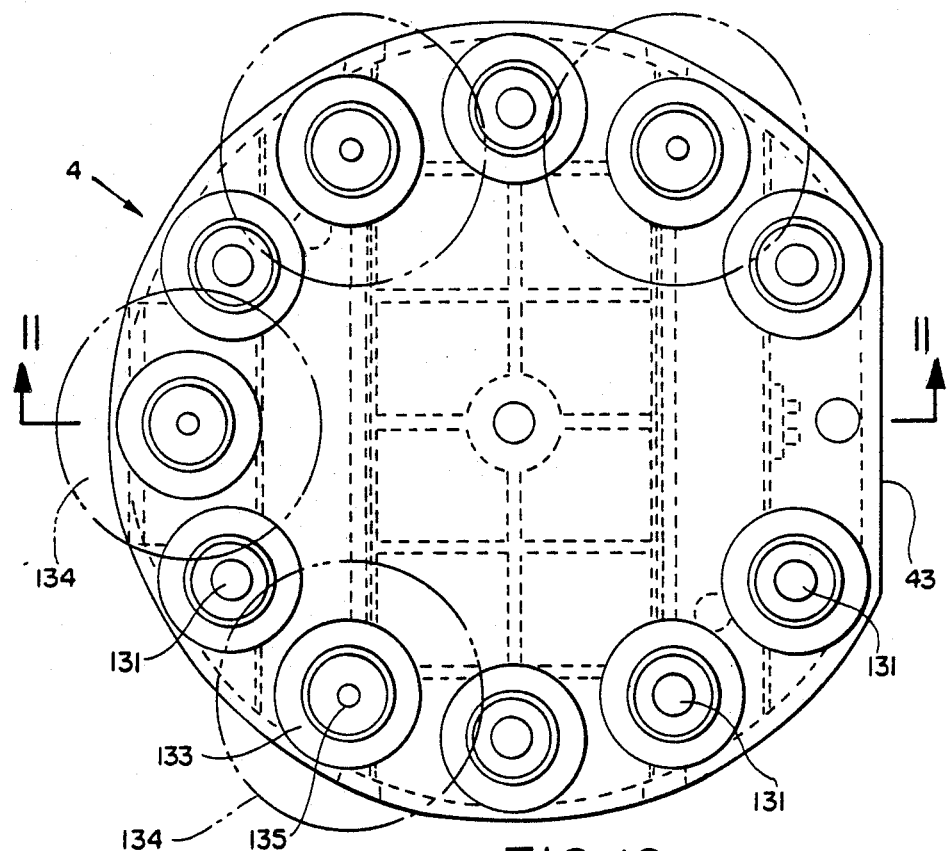
FIG. 10 is an enlarged top plan view of a tool pallet in accordance with this invention.
Figure 11:
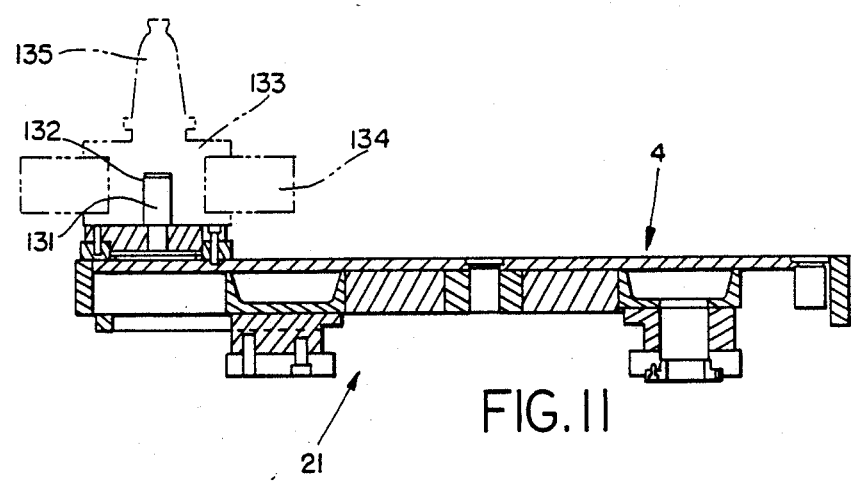
FIG. 11 is a transverse section through the tool pallet of FIG. 10, taken generally along the plane of the line 11—11 thereof.

The tool storage pallets 4 are also generally circular in shape to provide for turning of the pallets when at the tool storage station 6 to bring each tool supported thereby into vertical alignment with the machine tool spindle 7. However, such tool storage pallets 4 also desirably have a chordal face 43 along one side so that the tool storage pallets will clear the machine tool door 40 during transfer of the tool storage pallets onto and off the tool storage station of the machine tool apparatus when the door is closed during machining as previously described. Also, a plurality of vertical posts 131 are desirably clamped in circumferentially spaced relation to the upper face of the tool storage pallets for receipt in sockets 132 in tool adapters 133 to support the tools 134 on the pallets with the tapered outer ends 135 thereof projecting upwardly as shown in FIGS. 10 and 11 to facilitate engagement by the machine tool spindle 7 when moved into position above the tools while at the tool storage station 6.

The basic construction of the machine tool apparatus 1 and pallet changing system 2 of the present invention having thus been described, its operation will now be discussed with reference to FIGS. 26-34 which schematically show how the pallet changer is used to change both work pieces and tooling on the machine tool apparatus. In FIG. 26 the AGV 51 is shown in position at the docking assembly 10 for transfer of a transport fixture 50 with work piece pallet B mounted thereon from the AGV onto the docking assembly 10 in the manner previously described. The AGV is then free to be moved away from the docking assembly as shown in FIG. 27 or left thereat as desired.

The pallet changer 8 is then positioned so that its opposite ends are in alignment with the docking assembly 10 and work piece machining station 5 of the machine tool apparatus, whereupon the work piece pallet B at the docking assembly and another work piece pallet A at the work piece machining station 5 may be transferred onto the ends of the pallet changer as further shown in FIG. 27. Of course, the door 40 on the machine tool must be moved to the open position shown in FIG. 27 before the pallet A can be moved from the machine tool to the pallet changer. Next the pallet changer is rotated 180° thus interchanging pallets A and B as shown in FIG. 28 so that pallet B can be moved from the pallet changer to the work piece machining station 5 and pallet A can be moved from the pallet changer to the docking assembly as shown in FIG. 29.

After the pallet B has been properly centered and clamped at the work piece machining station 5 and the pallet changer hook has been withdrawn, the machine tool door 40 may be closed as further shown in FIG. 29 to permit one or more machining operations to be performed on the work piece in conventional manner. Likewise, after the pallet A has been transferred from the pallet changer 8 to the transport fixture 50 at the docking assembly 10 and the movable locating cones 101 have been lowered to disengage the pallet A from the pallet changer hook 30 and the hook has been withdrawn, the AGV 51 can be sent to the docking assembly 10 as further shown in FIG. 29 to pick up the pallet A and associated transport fixture and transport same to another location remote from the machine tool apparatus.

In similar manner, the pallet changer 8 can be used to change the tooling at the tool storage station 6 of the machine tool apparatus both before and after a machining operation as well as during a machining operation. As with the work piece pallets, AGV may be used to transport a transport fixture 50 and associated tool pallet Y containing the desired tooling to the docking assembly 10 for transfer of the transport fixture and tool pallet Y from the AGV to the docking assembly as shown in FIG. 30 and then transfer of the tool pallet Y from the docking assembly 10 to one end of the pallet changer 8 as shown in FIG. 31. Then the pallet changer 8 may be rotated 45° to align the other end of the pallet changer with the machine tool storage station 6 so that a tool pallet X thereat can be moved from the machine onto the pallet changer as shown in FIG. 32. Additional retractable rotational stops 140 and 141, as shown schematically in FIGS. 2 and 4, respectively, may be provided on the base member 15 of the pallet changer for locating the pallet changer at the additional 45° indexing positions.

Following such indexing movement of the pallet changer to the 45° position, the pallet changer is rotated 180° to interchange tool pallet X with tool pallet Y as shown in FIG. 33, so that the tool pallet Y can be moved from the pallet changer onto the machine tool storage station 6. Next the pallet changer is rotated an additional 45° to the position shown in FIG. 34 with the tool pallet X on the other end of the pallet changer in alignment with the docking assembly 10 so that the pallet X can be transferred onto the docking assembly and the AGV sent to the docking assembly to transport the tool pallet X away from the machine tool apparatus to a remote location, and so on.

With the new tool pallet Y stored in place at the tool storage station 6, it is a simple matter to change tools, it only being necessary to move the machine tool spindle 7 horizontally from the work piece machining station 5 to the tool storage station 6, and with the access door 42 (FIGS. 2 and 4) to the tool storage station open, lower the machine tool spindle first to deposit the old tool onto an unoccupied post 131 (FIGS. 10 and 11) on the tool pallet 4 and then to pick up a new tool 134 from one of the other occupied posts 131.

From the foregoing, it will now be apparent that the combination machine tool apparatus and pallet changing system of the present invention provides a simple and effective means for changing both work pieces at a work piece machining station and tools at a tool storage station on a machine tool apparatus utilizing a single pallet changer.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A lift table assembly for raising and lowering a load comprising a base member, a main frame, support means on said main frame for supporting such load thereon, jack means for raising and lowering said main frame relative to said base member, said support means including a floating subframe mounted for limited lateral movement in any direction relative to said main frame, said floating subframe having four sides, and centering springs acting on each of said sides for urging said floating subframe to a centered position with respect to said main frame.

2. The lift table assembly of claim 1 further comprising a plurality of locating cones attached to said floating subframe for movement therewith.

3. The lift table assembly of claim 1 further comprising means for applying a counterbalance force to said main frame to reduce the force required to lift such load supported by said main frame, said counterbalance means comprising a plurality of spaced apart counterbalance spring assemblies acting on said main frame, each of said counterbalance spring assemblies containing a stack of Belleville springs.

4. The lift table assembly of claim 3 wherein said jack means are driven by a DC motor, said counterbalance means being effective to reduce the peak requirement of said motor during raising of said main frame.

5. The lift table assembly of claim 1 further comprising a transport fixture for supporting a load carrying pallet on said subframe, said transport fixture including a set of sockets for engagement by locating cones on said subframe, and a receiver plate for sliding receipt of said load carrying pallet thereon.

6. The lift assembly of claim 1 in combination with a docking assembly, said docking assembly including a pair of laterally spaced side wall structures for supporting such load, said lift table assembly being operable to lift such load onto and off of said docking assembly.

7. In combination, a lift table assembly and a docking assembly, said lift table assembly including a base member, support means for supporting a load, and jack means for raising and lowering said support means relative to said base member for lifting such load onto and off said docking assembly, and said docking assembly including a pair of laterally spaced side wall structures for supporting such load, two sets of lift cylinders for raising and lowering such load relative to said side wall structures, and hydraulic load dividing and control circuit means for causing the same amount of fluid to enter to and from each of said lift cylinders during raising and lowering of such load by said lift cylinders regardless of the load distribution.

8. The combination of claim 7 wherein there are two of said lift cylinders in each set, each of said lift cylinders including a rod end and a head end, and said hydraulic flow dividing and control circuit means includes first and second flow control valves having opposite ends connected to the head ends of both of said lift cylinders of each set, and a third flow control valve having opposite ends connected to a center point on each of said first and second flow control valves, and a pilot check valve connected to a center point on said third flow control valve.

9. In combination, a lift table assembly and docking assembly, said lift table assembly including a base member, support means for supporting a load, jack means for raising and lowering said support means relative to said base member to lift such load onto and off said docking assembly, and said docking assembly including a pair of laterally spaced side wall structures for supporting such load, support beams mounted for vertical movement relative to said side wall structures, and lift cylinders mounted on said side wall structures and connected to said support beams for raising and lowering said support beams relative to said side wall structures for raising and lowering such load relative to said side wall structures.

10. The combination of claim 9 wherein such load is carried by a pallet supported by said support means, further comprising locating cones on said support beams for locating such pallet thereon.

11. The combination of claim 10 further comprising additional locating cones on said side wall structures for locating such pallet on said side wall structures when said support beams are in their lowermost positions.

12. The combination of claim 9 further comprising limit switch means to provide positive feedback that said lift cylinders and thus such load have raised or lowered.

13. The combination of claim 9 further comprising a transport vehicle for transporting such load to and from said docking assembly, said lift table assembly being carried by said transport vehicle for lifting such load off said transport vehicle and lowering such load onto said docking assembly and vice versa.

14. The combination of claim 13 further comprising a transport fixture for supporting a load carrying pallet on said lift table assembly and on said docking assembly, said transport fixture including a first set of socket means engageable with locating cones on said lift table assembly, and a second set of socket means outwardly spaced from said first set of socket means engageable with additional locating cones on said docking assembly.

15. The combination of claim 13 further comprising a transport fixture for supporting a load carrying pallet on said lift table assembly and on said docking assembly, said transport fixture including a receiver plate for sliding receipt of such pallet thereon.

16. A lift table assembly for raising and lowering a load comprising a base member, a main frame, support means on said main frame for supporting such load thereon, jack means for raising and lowering said main frame relative to said base member, said support means including a floating subframe mounted for limited lateral movement relative to said main frame, and centering springs acting on opposite sides of said floating subframe for uging said floating subframe to a centered position with respect to said main frame, said subframe comprising a pair of cross beams extending at right angles to each other, said centering springs acting on opposite sides of each end of said cross beams.

17. The lift table assembly of claim 16 further comprising a plurality of locating cones attached to each end of each of said cross beams for movement therewith.

18. A lift table assembly for raising and lowering a load comprising a base member, a main frame, support means on said main frame for supporting such load thereon, jack means for raising and lowering said main frame relative to said base member, said support means including a floating subframe mounted for limited lateral movement relative to said main frame, centering springs acting on opposite sides of said floating subframe for urging said floating subframe to a centered position with respect to said main frame, means for applying a counterbalance force to said main frame to reduce the force required to lift such load supported by said main frame, said jack means being driven by a DC motor, and said counterbalance means being effective to reduce the peak requirement of said motor during raising of said main frame, said counterbalance means comprising a plurality of spaced apart counterbalance spring assemblies acting on said main frame, each of said counterbalance spring assemblies containing a stack of Belleville springs.

* * * * *